US009822916B2

(12) United States Patent
Conrad

(10) Patent No.: US 9,822,916 B2
(45) Date of Patent: Nov. 21, 2017

(54) EXPANSION COMPENSATOR WITH MULTIPLE LAYERS WITH DIFFERING STIFFNESS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 254 days.

(21) Appl. No.: 14/659,116

(22) Filed: Mar. 16, 2015

(65) Prior Publication Data

US 2015/0267853 A1  Sep. 24, 2015

(30) Foreign Application Priority Data

Mar. 18, 2014 (CA) .................................... 2846921

(51) Int. Cl.
*F16L 9/14* (2006.01)
*F16L 51/02* (2006.01)

(52) U.S. Cl.
CPC ........... *F16L 51/025* (2013.01); *F16L 51/027* (2013.01); *F16L 51/028* (2013.01)

(58) Field of Classification Search
USPC ... 285/903, 299, 55, 45, 226, 227, 228, 235, 285/293.1, 121
See application file for complete search history.

(56) References Cited

U.S. PATENT DOCUMENTS

| | | | |
|---|---|---|---|
| 2,645,249 A | 7/1953 | Davis et al. | |
| 3,183,022 A | 5/1965 | Sayag | |
| 3,235,291 A | 2/1966 | Jacoby | |
| 3,299,417 A | 1/1967 | Sibthorpe | |
| 3,315,704 A * | 4/1967 | Shire ....................... | F16L 27/11 138/121 |
| 3,372,076 A | 3/1968 | Wilkinson | |
| 3,540,489 A | 11/1970 | Hanson | |
| 3,550,639 A | 12/1970 | Okuda | |

(Continued)

FOREIGN PATENT DOCUMENTS

| CN | 2265469 Y | 10/1997 |
|---|---|---|
| CN | 101089446 | 12/2007 |

(Continued)

OTHER PUBLICATIONS

Flexcom: U-Belt Fabric Expansion Joint Design: Mosture, UV and Atmospheric Aging.

(Continued)

*Primary Examiner* — Aaron Dunwoody
(74) *Attorney, Agent, or Firm* — Philip C. Mendes de Costa; Bereskin & Parr LLP/S.E.N.C.R.L., s.r.l.

(57) ABSTRACT

An expansion compensator having a longitudinal axis, and having an elongate metal conduit with first and second spaced apart ends and an expansion/contraction section, an inner plastic liner positioned interior of the elongate metal conduit and having an expansion/contraction section and an interior volume extending from the first end to the second end, wherein each of the elongate metal conduit and the inner plastic liner have a stiffness along the longitudinal axis, and the stiffness of the elongate metal conduit is greater than the stiffness of the inner plastic liner.

27 Claims, 13 Drawing Sheets

(56) References Cited

U.S. PATENT DOCUMENTS

| | | | |
|---|---|---|---|
| 3,605,232 A | 9/1971 | Hines | |
| 3,623,339 A * | 11/1971 | Muller | F16D 3/72 |
| | | | 285/226 |
| 3,626,988 A | 12/1971 | Chu | |
| 3,655,224 A | 4/1972 | Carberry et al. | |
| 3,743,328 A | 7/1973 | Longfellow | |
| 3,747,367 A * | 7/1973 | Muller | F16D 3/74 |
| | | | 285/226 |
| 3,807,777 A | 4/1974 | Larkin | |
| 3,927,818 A | 12/1975 | Harrington | |
| 3,976,312 A | 8/1976 | Murphree | |
| 4,054,158 A | 10/1977 | Hoeman et al. | |
| 4,135,634 A | 1/1979 | Frye | |
| 4,265,276 A | 5/1981 | Hatada et al. | |
| 4,576,404 A | 3/1986 | Weber | |
| 4,591,193 A | 5/1986 | Oltmanns et al. | |
| 4,652,475 A | 3/1987 | Haney et al. | |
| 4,683,917 A * | 8/1987 | Bartholomew | F16L 11/118 |
| | | | 138/109 |
| 4,712,642 A | 12/1987 | Lalikos et al. | |
| 4,763,932 A | 8/1988 | Matz et al. | |
| 4,781,003 A | 11/1988 | Rizza | |
| 4,854,416 A | 8/1989 | Lalikos et al. | |
| 4,864,711 A | 9/1989 | Yokota | |
| 5,058,934 A | 10/1991 | Brannon | |
| 5,135,265 A | 8/1992 | Bouscher et al. | |
| 5,174,613 A | 12/1992 | Joug | |
| 5,284,184 A | 2/1994 | Noone et al. | |
| 5,305,799 A | 4/1994 | Dal Palu | |
| 5,362,113 A | 11/1994 | Thomas | |
| 5,507,319 A * | 4/1996 | Kanao | B29C 49/0021 |
| | | | 138/110 |
| 5,554,426 A | 9/1996 | Röber et al. | |
| 5,706,864 A | 1/1998 | Pfleger | |
| 5,791,696 A | 8/1998 | Miyajima et al. | |
| 5,799,703 A | 9/1998 | Kanao et al. | |
| 5,813,438 A | 9/1998 | Reed | |
| 5,850,855 A * | 12/1998 | Kerschbaumer | F16L 11/15 |
| | | | 138/121 |
| 6,166,143 A | 12/2000 | Watanabe et al. | |
| 6,293,311 B1 | 9/2001 | Bushi et al. | |
| 6,321,794 B1 * | 11/2001 | Ishida | F16L 11/118 |
| | | | 138/121 |
| 6,386,240 B1 | 5/2002 | Roeber et al. | |
| 6,409,226 B1 | 6/2002 | Slack et al. | |
| 6,412,520 B1 * | 7/2002 | Yasumatsu | F16L 11/11 |
| | | | 138/121 |
| 6,455,118 B1 | 9/2002 | Dewimille et al. | |
| 6,494,497 B1 | 12/2002 | Kertesz | |
| 6,576,342 B1 | 6/2003 | Cerf et al. | |
| 6,581,984 B1 * | 6/2003 | Seung-Kyu | F16L 25/0036 |
| | | | 285/368 |
| 6,631,928 B1 | 10/2003 | Sakata | |
| 6,755,217 B1 * | 6/2004 | Yoshida | F16L 11/112 |
| | | | 138/121 |
| 6,848,719 B2 * | 2/2005 | Rowley | B29C 57/04 |
| | | | 285/226 |
| 6,880,861 B2 | 4/2005 | Muroi et al. | |
| 7,004,201 B2 | 2/2006 | Arima et al. | |
| 7,083,204 B1 | 8/2006 | Miller et al. | |
| 7,108,294 B1 | 9/2006 | Miller et al. | |
| 7,132,141 B2 | 11/2006 | Thullen et al. | |
| 7,143,788 B2 | 12/2006 | Keyes | |
| 7,284,771 B2 | 10/2007 | Baumann et al. | |
| 7,398,798 B2 | 7/2008 | Ostan et al. | |
| 8,291,943 B2 | 10/2012 | Walle et al. | |
| 2004/0207201 A1 | 10/2004 | Starita | |
| 2004/0226622 A1 | 11/2004 | Hayashi | |
| 2004/0256017 A1 * | 12/2004 | Arima | B29D 23/001 |
| | | | 138/126 |
| 2004/0256018 A1 * | 12/2004 | Ikemoto | B29D 23/001 |
| | | | 138/126 |
| 2006/0244259 A1 | 11/2006 | Saito et al. | |
| 2006/0278292 A1 | 12/2006 | Froitzheim et al. | |
| 2007/0227606 A1 * | 10/2007 | Sakazaki | F16L 11/111 |
| | | | 138/121 |
| 2008/0210329 A1 | 9/2008 | Quigley et al. | |
| 2009/0076595 A1 | 3/2009 | Lindquist et al. | |
| 2009/0114304 A1 | 5/2009 | Mohri et al. | |
| 2010/0200100 A1 | 8/2010 | Lupke et al. | |
| 2012/0216903 A1 | 8/2012 | Osborne | |
| 2013/0269819 A1 | 10/2013 | Ruby et al. | |
| 2014/0299218 A1 * | 10/2014 | Hirth | B21C 37/20 |
| | | | 138/121 |
| 2016/0215917 A1 | 7/2016 | Army et al. | |

FOREIGN PATENT DOCUMENTS

| | | |
|---|---|---|
| CN | 202171086 | 3/2012 |
| DE | 3123625 A1 | 1/1983 |
| EP | 0789137 A2 | 8/1997 |
| EP | 1002982 A2 | 5/2000 |
| EP | 1010930 | 6/2000 |
| GB | 837559 | 6/1960 |
| WO | 97/18408 | 5/1997 |
| WO | 2012/078842 A1 | 6/2012 |
| WO | 2013/135244 A1 | 9/2013 |
| WO | 2013/137745 A1 | 9/2013 |

OTHER PUBLICATIONS

Kohaflex Ltd.: "Metal Expansion Joints", General information.
A.R. Laminators: "High End Pipe Line Protection Technology".
Stark, Choi and Diebel: "Plasticizer Retention in PVC Geomembranes"; GS 142 Waste Containment and Remediation.
WiseGEEK: What is Bellows Expansion Joint.

* cited by examiner

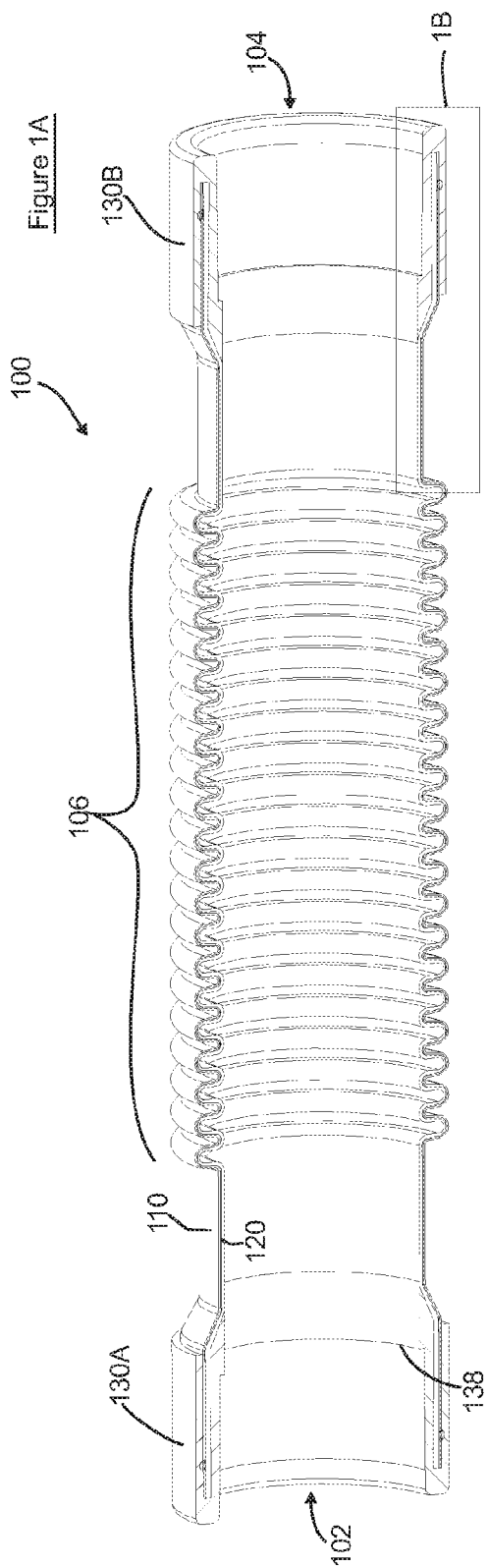
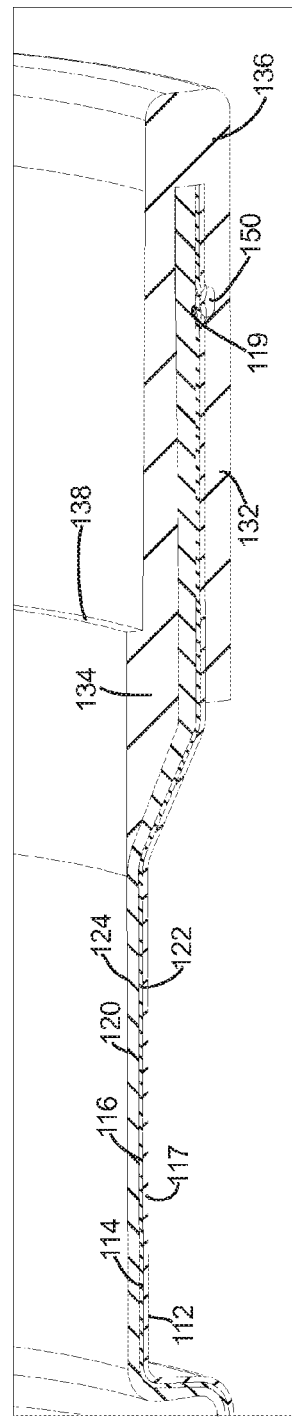

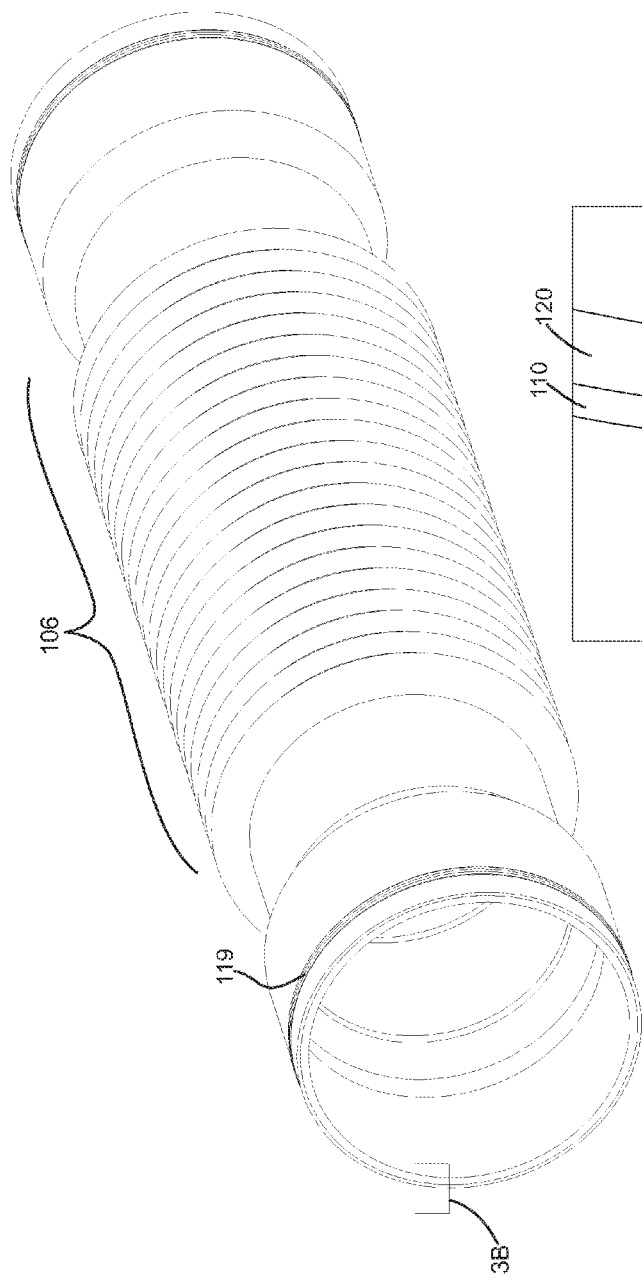
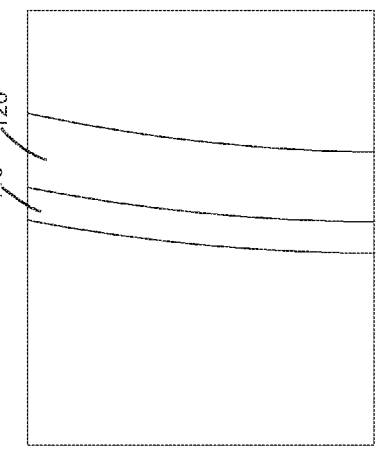

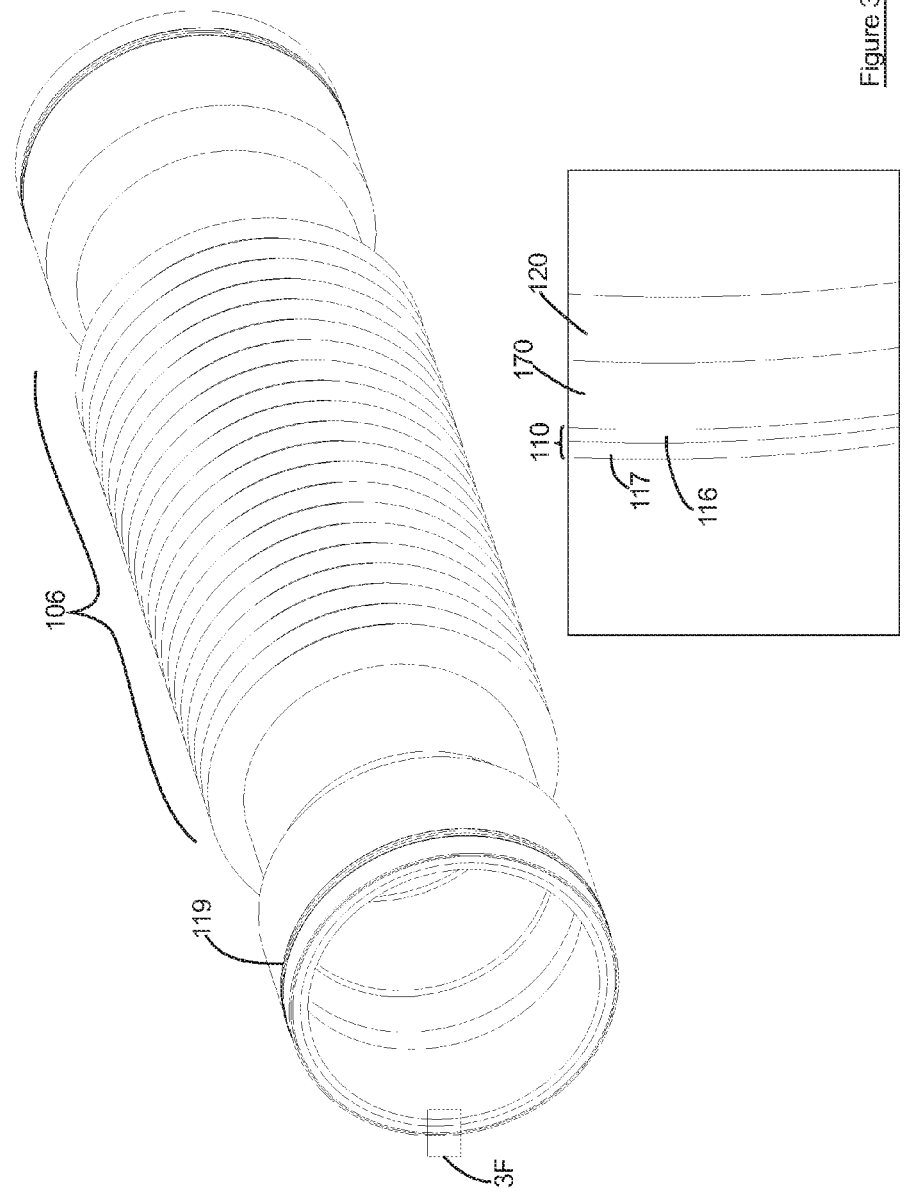

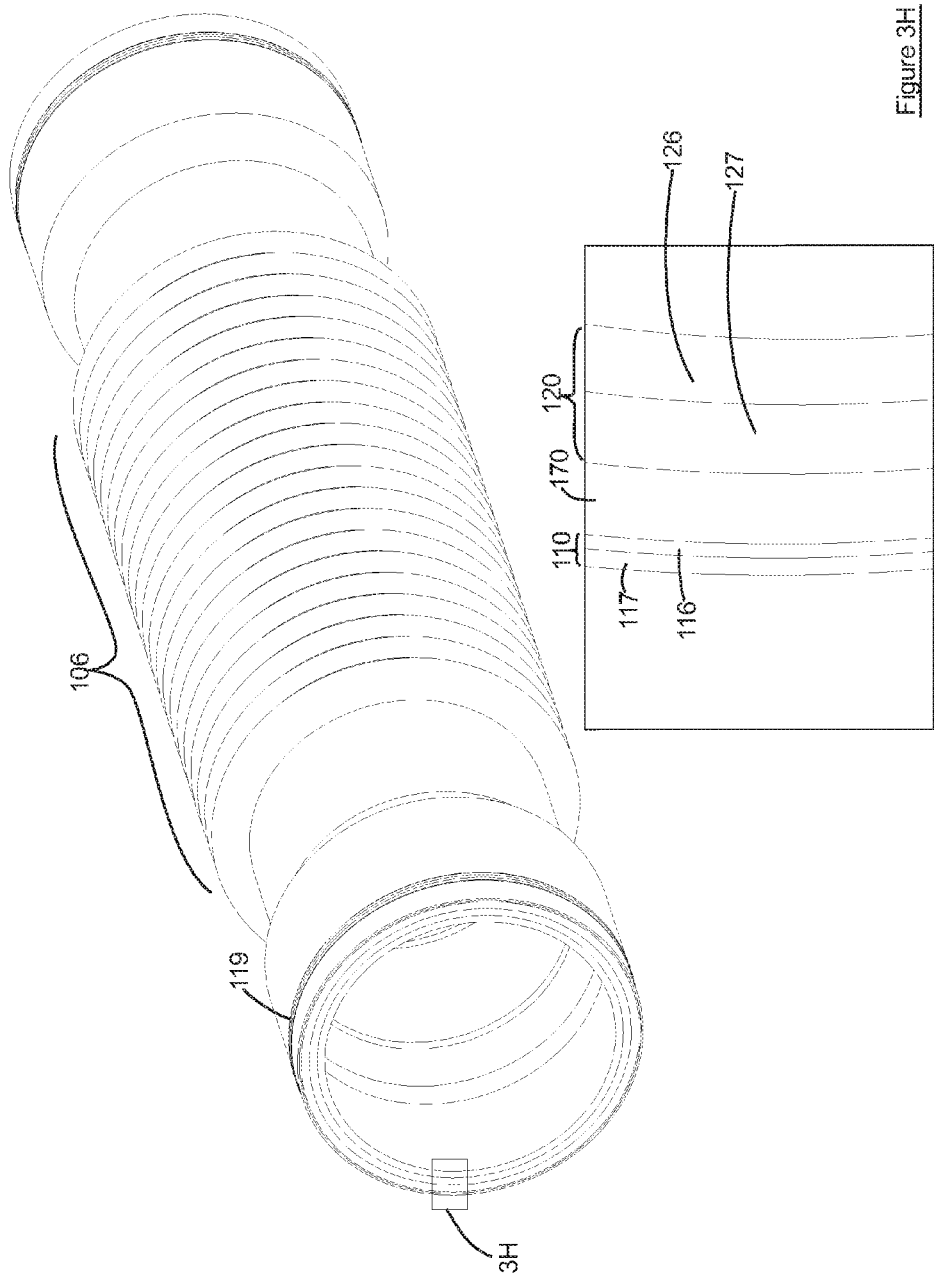

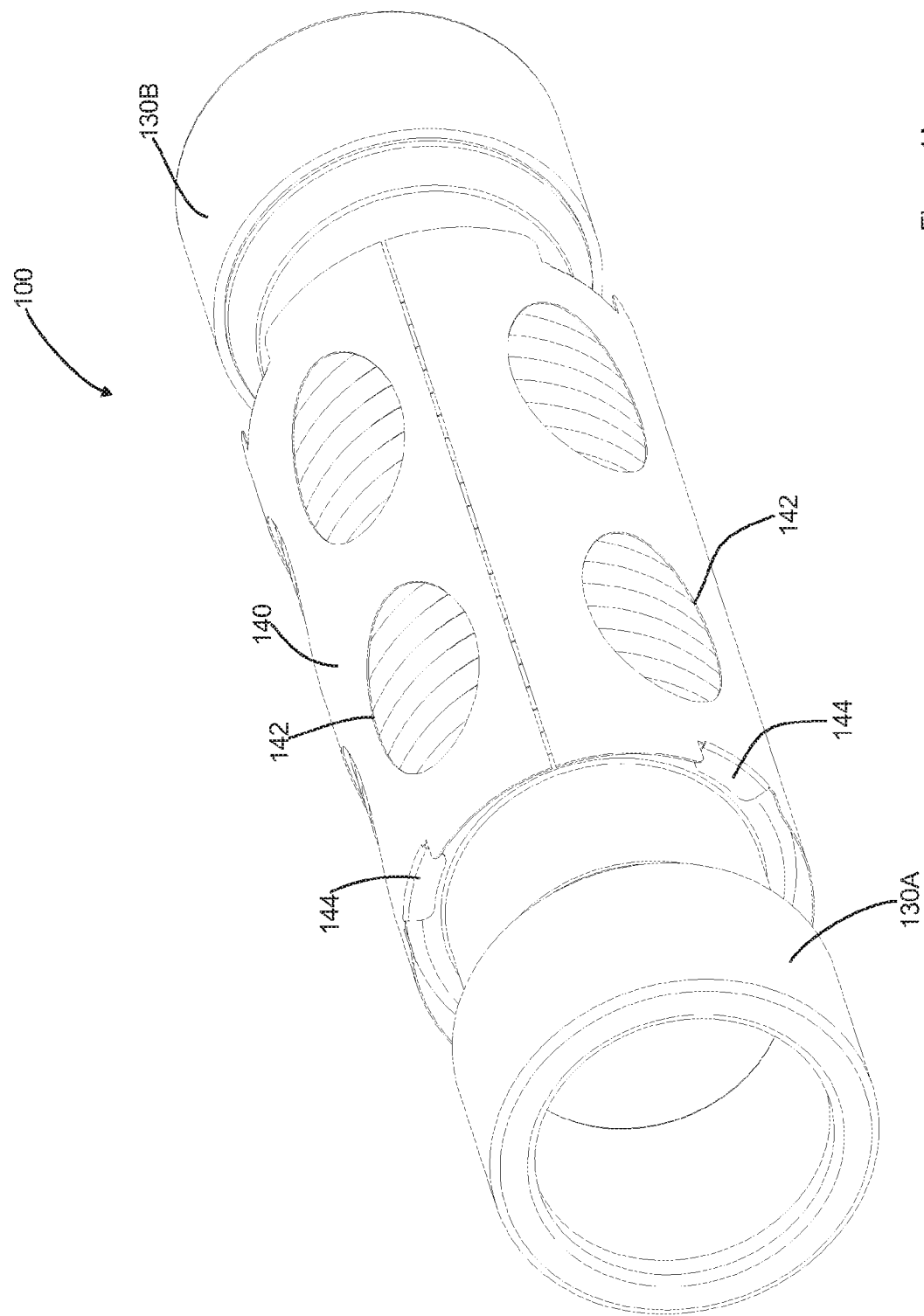

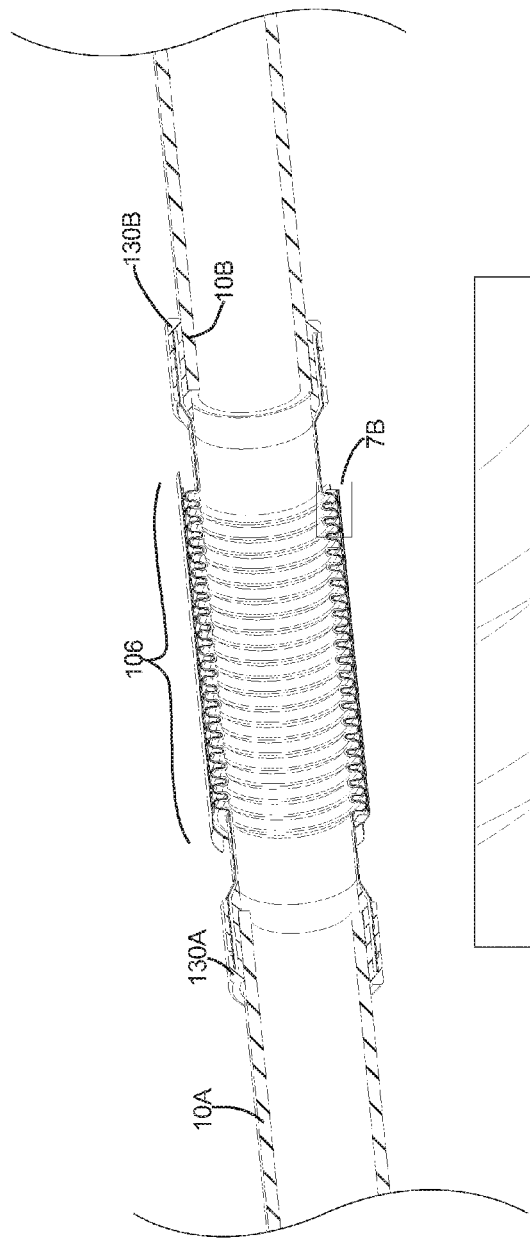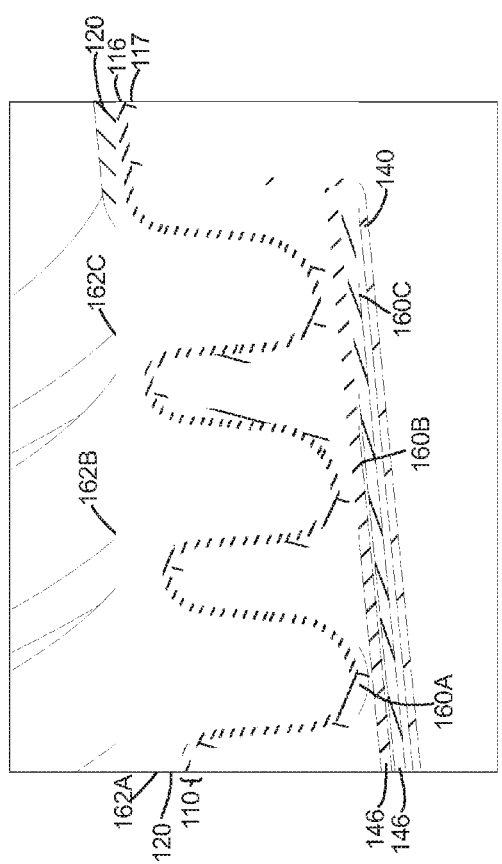

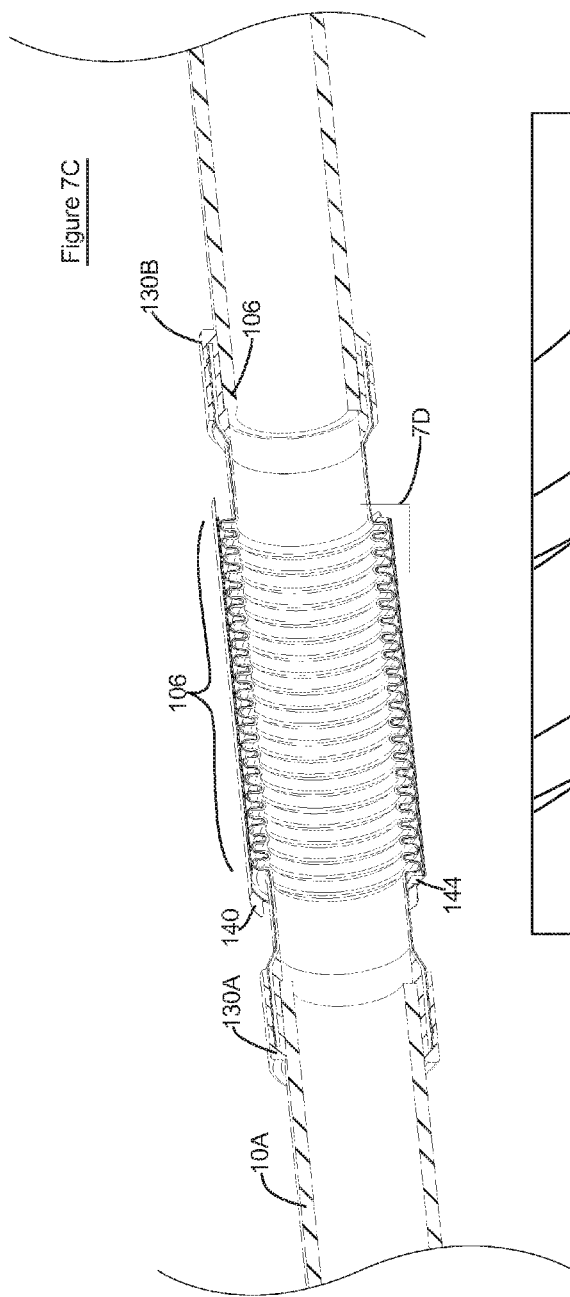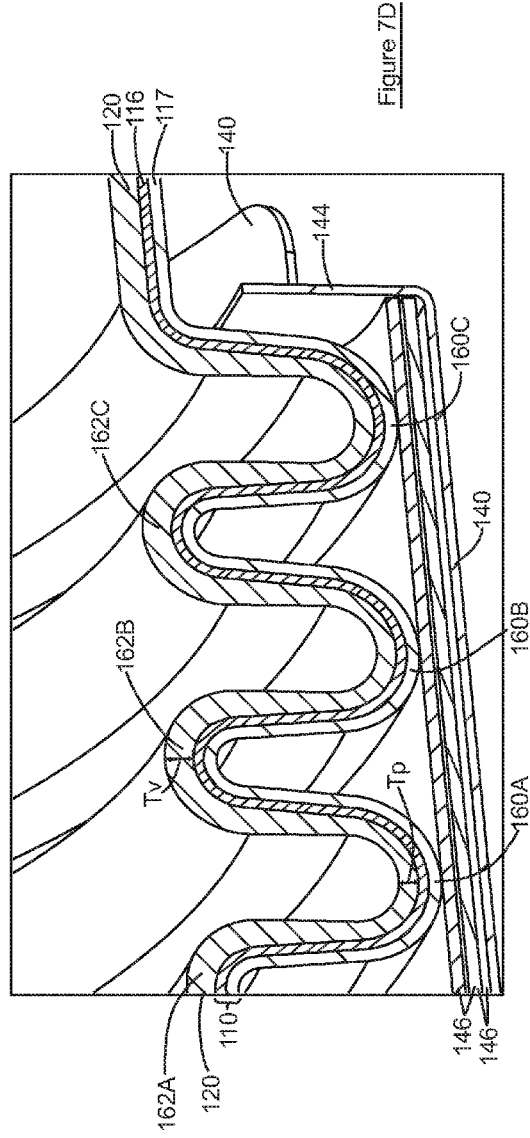

EXPANSION COMPENSATOR WITH MULTIPLE LAYERS WITH DIFFERING STIFFNESS

CROSS-REFERENCES TO RELATED APPLICATION

This application claims the benefit of priority under 35 USC 119 from Canadian Patent Application No. 2,846,921, filed on Mar. 18, 2014, entitled EXPANSION COMPENSATOR WITH MULTIPLE LAYERS WITH DIFFERING STIFFNESS, the specifications of which is incorporated herein by reference in its entirety.

FIELD

This disclosure relates generally to an expansion compensator for connecting pipes and fittings that are used to convey a fluid.

INTRODUCTION

Piping systems are used to convey liquids and/or gasses within, or between, residential, commercial, and/or industrial buildings. For example, most residential buildings have a potable water distribution system for providing cold and/or hot water at one or more locations within the building (e.g. sinks, showers, dish or clothes washing machines).

Typically, piping systems are made up of a number of components including straight or curved pipe sections, fittings (e.g. elbow fittings), valves, etc. to provide an interior flow path for the liquid being conveyed. Typically, a piping system (such as a system comprising thermoplastic pipes), is assembled such that the components are joined in a manner that provides a durable connection that prevents or inhibits the components from separating or cracking due to mechanical, thermal, and/or hydraulic stresses applied to the piping system. Separation of any of the components of the piping system or cracking of any element of the piping system may permit fluid to leak out of the piping system and, e.g., thereby damage the surrounding structure, e.g., the walls of a building which enclose the piping system.

Thermoplastic pipes (such as polyvinyl chloride (PVC) and/or chlorinated polyvinyl chloride (CPVC) pipes) may be subject to thermal expansion and/or contraction after installation. For example, a length of a thermoplastic pipe used for conveying fluid at an elevated temperature (e.g. hot water) may be subject to axial expansion and/or contraction based on the relative temperature of the fluid being conveyed, and the ends of the pipe may exert an axial force (either compressive or tensile) on the fittings, valves, or other parts of the piping system to which they are connected. Typically, hot water usage is intermittent. Therefore, hot water may be conveyed through a pipe for a period of time thereby heating the pipe. Subsequently, the flow of water will be terminated and the water in the pipe will cool as heat is dissipated to the ambient surrounding structure. This heating and cooling will cause the pipe to expand and contract axially. This cycle may be repeated several times a day or an hour. Continued thermal cycling of thermoplastic pipes (e.g., PVC and/or CPVC pipes) can result in a failure of the piping system and result in a leak.

Further, in a high rise building, plastic pipes that are mounted vertically to transport water between floors are mechanically constrained in their mechanical positions due to their mechanical attachment to transversely mounted pipes that deliver water horizontally to the various rooms or locations on the floors of the building. As such, when plastic pipes such as those made of PVC and CPVC are heated by the water that they transport, significant forces are created within the walls of the pipe due to the thermal expansion. These forces may exceed the buckling strength of the pipes, especially for pipe diameters under 6 inches, which may cause the plastic pipes to bend and/or buckle. This stress may result in a leak.

Once an installation is complete (e.g., the interior walls of a building are finished or a piping system is buried under a road), accessing the piping system to repair a leak is typically time consuming and expensive.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

An expansion compensator may expand and/or contract in response to an applied axial force (compressive or tensile) that may arise from expansion and/or contraction of one or more lengths of pipe. For example, one or more such expansion compensators can be installed between a length of pipe and a fitting so that the axial forces that may be imposed on the pipe and/or the fitting due to thermal expansion and/or contraction of the length of pipe may be reduced. These axial forces may be borne by, or primarily borne by, or substantially borne by the expansion compensator and not by the pipe and/or the fitting. In the case in a high rise building (as compared to a house), each portion of the piping system that conveys hot water to each floor will be subjected to thermal expansion and contraction cycling. Without the use of an expansion compensator, the total expansion which may occur in the piping system carrying hot water to the top floor will be the aggregate of the expansion occurring for each floor of vertical rise, which may prevent the use of plastic piping.

In one broad aspect, there is provided an expansion compensator comprising an outer metal conduit and an inner plastic liner wherein the outer metal conduit and the inner plastic liner may be secured together and wherein the axial stiffness of the metal conduit is greater than the axial stiffness of the inner plastic liner so that the outer metal conduit absorbs more (optionally a substantial portion or essentially all) of stresses imposed on the expansion compensator due to thermal cycling of the piping system. Accordingly, while axial forces imposed by a piping system may be borne by, or primarily borne by, or substantially borne by the expansion compensator, these axial forces may, in turn, be preferentially borne by (e.g., borne by, or primarily borne by, or substantially borne by) the outer metal conduit.

An advantage of this design is that by utilizing a metal conduit to reinforce the inner plastic liner, the expansion/contraction section (e.g., a bellows or accordion section) of the inner plastic liner may be made of a thinner material which increases the flexibility of the inner plastic liner and reduces the likelihood of the inner plastic liner cracking over time due to expansion and contraction caused by thermal cycling. In particular, since the inner plastic liner is reinforced or supported by the outer metal conduit, the axial forces imposed on the expansion compensator are preferentially absorbed by the outer metal conduit and the stress imposed on the inner plastic liner is reduced, which reduces the likelihood of the inner plastic liner cracking thereby resulting in a leak.

The pipe may be made of a plastic material known in the piping arts. The plastic material may be a thermoplastic material and may be one or more of acrylonitrile butadiene styrene (ABS), PVC, CPVC, ethylene vinyl acetate (EVA), polyethylene (PE), and the like. Preferred materials comprise PVC and/or CPVC.

An advantage of using such an expansion compensator is that plastic piping may be used in installations requiring a long run of piping, such as in a high rise building. By providing an expansion compensator that will enable expand or contract in length due to thermal heating and cooling of the piping system, each fitting, e.g., a T-junction, may remain essentially static thereby increasing the reliability of the piping system and reducing the likelihood of a leak occurring.

The outer metal conduit and the inner plastic liner may be secured together such that fluid flowing in the piping system is not exposed to the outer metal conduit (e.g., the inner plastic liner defines the outer wall of the flow path through the expansion compensator from a pipe or fitting connected at one end of the expansion compensator to a pipe or fitting connected at the other end of the expansion compensator). Accordingly, a further optional advantage of this design is that the fluid in the piping system may be exposed only to the inner plastic liner and the outer metal conduit will not be exposed to the fluid, e.g., water, which may cause the metal to corrode over time. For example, at least one, and preferably each end of the outer metal conduit and the inner plastic liner may be provided with a connector that may secure the outer metal conduit and the inner plastic liner together to provide a unitary body (i.e., so that together the outer metal conduit and the inner plastic liner act as a single body.

Connectors that are compatible with typical thermoplastic piping system components (e.g., pipe ends; fittings such as valves, tees, couplers, elbows, and the like) may be provided at each end of the expansion compensator to facilitate its installation. For example, the connectors may be configured to accept typical pipe end dimensions, and for joining and/or sealing using typical means. Also, the expansion compensator may have an inner plastic liner made from the same (or similar) plastic material of the pipes to which it is to be installed, so that a fluid flowing through a pipe and expansion compensator will be in contact with the same (or similar) material through both components.

In accordance with this broad aspect, there is provided an expansion compensator having a longitudinal axis and comprising:
  a) an elongate metal conduit having first and second spaced apart ends, an inner surface, an outer surface, a thickness, and an expansion/contraction section; and
  b) an inner plastic liner positioned interior of the elongate metal conduit and having first and second spaced apart ends, an inner surface, an outer surface, a thickness, an expansion/contraction section, and an interior volume extending from the first end to the second end;
  wherein the first and second spaced apart ends of the elongate metal conduit and the inner plastic liner are secured together,
  and wherein each of the elongate metal conduit and the inner plastic liner have a stiffness along the longitudinal axis, and the stiffness of the elongate metal conduit is greater than the stiffness of the inner plastic liner.

In some embodiments, the stiffness of the elongate metal conduit may be at least 25% greater than the stiffness of the inner plastic liner.

In some embodiments, the stiffness of the elongate metal conduit may be at least 50% greater than the stiffness of the inner plastic liner.

In some embodiments, the stiffness of the elongate metal conduit may be from at least 150% greater to about 1,000% greater than the stiffness of the inner plastic liner.

In some embodiments, the stiffness of the elongate metal conduit may be from at least 300% greater to about 375% greater than the stiffness of the inner plastic liner.

In some embodiments, the stiffness of the elongate metal conduit may be sufficiently greater than the stiffness of the inner plastic liner such that the elongate metal conduit will absorb more than 50% of a compressive force imposed on the expansion compensator by a piping system into which the expansion compensator is positioned.

In some embodiments, the stiffness of the elongate metal conduit may be sufficiently greater than the stiffness of the inner plastic liner such than the elongate metal conduit will absorb more than 75% of the compressive force.

In some embodiments, the stiffness of the elongate metal conduit may be sufficiently greater than the stiffness of the inner plastic liner such than the elongate metal conduit will absorb about 90% of the compressive force.

In some embodiments, the thickness of the elongate metal conduit and the thickness of the inner plastic liner may each be selected to provide the stiffness of the elongate metal conduit that is greater than the stiffness of the inner plastic liner.

In some embodiments, the thickness of the elongate metal conduit may be from about 0.005 to about 0.030 inches and the thickness of the inner plastic liner may be from about 0.005 to about 0.250 inches.

In some embodiments, the thickness of the elongate metal conduit may be from about 0.012 to about 0.016 inches and the thickness of the inner plastic liner may be from about 0.040 to about 0.090 inches.

In some embodiments, the first spaced apart ends of the elongate metal conduit and the inner plastic liner are secured together by a first connector that is molded over the first spaced apart ends and the second spaced apart ends of the elongate metal conduit and the inner plastic liner are secured together by a second connector that is molded over the second spaced apart ends. Optionally, each of the first and second ends of the elongate metal conduit has a plurality of openings therethrough and each of the connectors further comprises a connecting portion that extends through the plurality of openings.

In some embodiments, the expansion compensator may further comprise a connector provided at each of the first and second ends of the elongate metal conduit and the inner plastic liner, each connector having a first portion secured to the outer surface of the elongate metal conduit, a second portion secured to the inner surface of the inner plastic liner, and an opening in fluid communication with the interior volume of the inner plastic liner.

In some embodiments, each of the first and second ends of the elongate metal conduit may have a plurality of openings therethrough and each of the connectors may further comprise a connecting portion that extends between the first portion of the respective connector and the outer surface of the inner plastic liner and passes through the plurality of openings.

In some embodiments, the first and second portions of the connector provided at the first ends of the elongate metal conduit and the inner plastic liner may define a generally U-shaped cavity in which the first ends of the elongate metal conduit and the inner plastic liner are located.

In some embodiments, the expansion compensator may further comprise a gasket provided on the elongate metal conduit and extending between the outer surface of the elongate metal conduit and an inner surface of the first connector.

In some embodiments, the elongate metal conduit may comprise at least an inner and an outer elongate metal conduit, the inner elongate metal conduit is positioned intermediate the outer elongate metal conduit and the inner plastic liner, and each of the inner and outer elongate metal conduits has first and second spaced apart ends, an inner surface, an outer surface, and an expansion/contraction section.

In some embodiments, the thickness of each of the inner and outer elongate metal conduit may be from about 0.004 to about 0.025 inches and the thickness of the inner plastic liner may be from about 0.005 to about 0.250 inches.

In some embodiments, the thickness of each of the inner and outer elongate metal conduit may be from about 0.012 to about 0.016 inches and the thickness of the inner plastic liner may be from about 0.040 to about 0.090 inches.

In some embodiments, a lubricant may be provided between the inner and outer elongate metal conduits.

In some embodiments, the expansion compensator may further comprise a protective layer intermediate the inner surface of the elongate metal conduit and the outer surface of the inner plastic liner.

In some embodiments:
a) the protective layer may comprise a coating or a film applied to at least one of the inner surface of the elongate metal conduit and the outer surface of the inner plastic liner; or
b) the inner plastic liner may comprise a co-extruded body having the protective layer formed as an outer co-extruded layer; or
c) the protective layer may comprise a separately formed sleeve positioned between the inner surface of the elongate metal conduit and the outer surface of the inner plastic liner.

In some embodiments, the expansion/contraction sections may have a similar profile and may be aligned.

In some embodiments, the inner plastic liner may have a generally uniform thickness.

In some embodiments, the expansion/contraction section of the inner plastic liner may comprise a bellows comprising in sequence a plurality of radially inner valleys and a plurality of radially outer peaks, a portion of the inner plastic liner defining the radial inner valleys having a greater radial thickness then a portion of the inner plastic liner defining the radial outer peaks.

In some embodiments, the expansion compensator may further comprise a longitudinally extending recess provided in the inner wall of the elongate metal conduit.

In some embodiments, the expansion compensator may further comprise a sleeve, the sleeve having a generally longitudinally extending outer surface and the elongate metal conduit is provided interior of the sleeve.

In some embodiments, a lubricant may be provided between the sleeve and the elongate metal conduit.

In some embodiments, the sleeve may further comprise engagement members positioned to maintain sleeve is a predetermined axial position along the expansion compensator and to permit the expansion/contraction sections to expand to a full design expansion length.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below. The apparatus and methods described herein may be used to connect pipes and/or fittings of various materials (e.g. metallic pipes, thermoplastic pipes) to create piping systems for transporting various liquids or gasses. It will be appreciated that the piping system that uses the expansion compensator may be made from different materials (e.g., the pipes may be made of PVC and/or CPVC and the fittings may be made of metal). Alternatively, the piping system components (or at least their inner surfaces through which fluid is conveyed) may be made of the same material.

Furthermore, the apparatus and methods may be applied to different sizes of piping, and/or piping systems made of the same or different materials, and therefore may be applicable to piping systems for domestic or commercial uses, such as conveying potable water, non-potable or waste water, or other liquids and/or gasses.

BRIEF DESCRIPTION OF THE DRAWINGS

For a better understanding of the described embodiments and to show more clearly how they may be carried into effect, reference will now be made, by way of example, to the accompanying drawings in which:

FIG. 1A is a cross section view of an expansion compensator in accordance with one embodiment;

FIG. 1B is an enlarged view of the box 1B in FIG. 1A of the expansion compensator of FIG. 1A;

FIG. 3A is a perspective view of an elongate metal conduit and an inner plastic liner in accordance with the embodiment of FIG. 1A;

FIG. 3B is an enlarged view of the box in FIG. 3A;

FIG. 3E is a perspective view of a two-layer elongate metal conduit, a protective layer, and an inner plastic liner in accordance with another embodiment;

FIG. 3F is an enlarged view of the box in FIG. 3E;

FIG. 3G is a perspective view of a two-layer elongate metal conduit, a protective layer, and a two-layer inner plastic liner in accordance with another embodiment;

FIG. 3H is an enlarged view of the box in FIG. 3G;

FIG. 4A is a perspective view of the expansion compensator of FIG. 1A with a sleeve;

FIG. 7A is a cross section view of FIG. 6B;

FIG. 7B is an enlarged view of the box 7B in FIG. 7A;

FIG. 7C is a cross section view of an alternate expansion compensator with pipe ends received in the connectors of the expansion compensator; and, FIG. 7D is an enlarged view of the box 7D in FIG. 7C.

Figure 5:
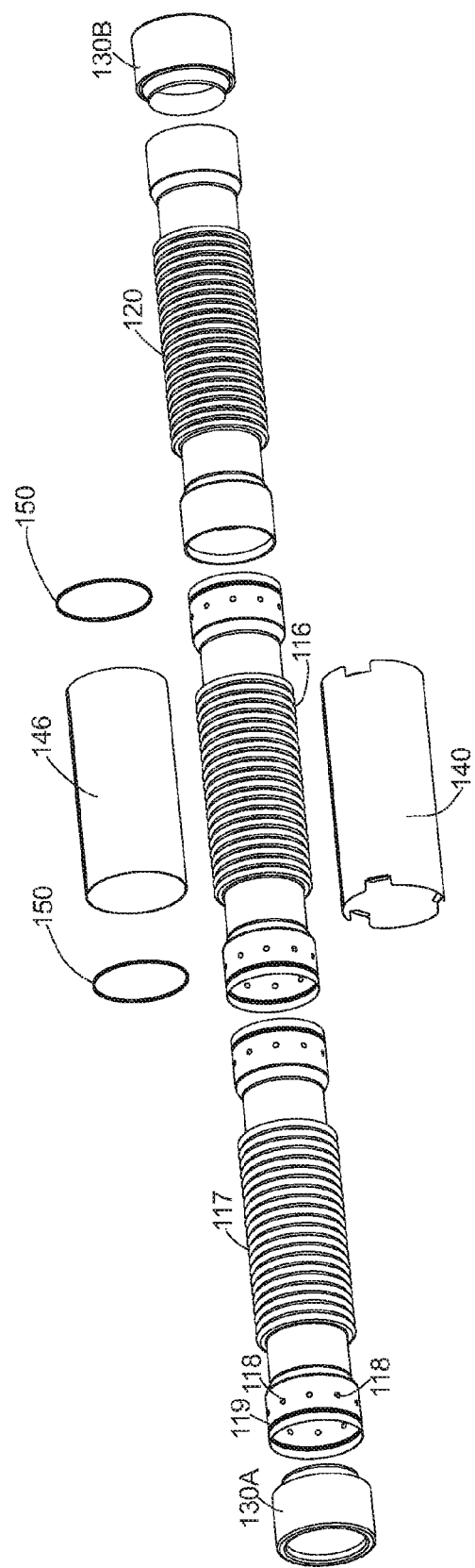
FIG. 5 is an exploded view of the expansion compensator of FIG. 4B.

It will be appreciated that FIG. 5 is for reference only, and that it may not be possible to assemble and/or disassemble expansion compensator 100 with the components in their illustrated configurations.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The apparatuses, methods and compositions may be used with piping systems made of various materials. The pipes and/or fittings to be connected may be made of a plastic material and optionally a thermoplastic material. The thermoplastic material may be one or more of acrylonitrile butadiene styrene (ABS), PVC, CPVC, ethylene vinyl acetate (EVA), polyethylene (PE) or the like. Preferably, the thermoplastic material is one or more of PVC and CPVC.

The drawings exemplify the use of the expansion compensator to connect sections of pipe together. It will be appreciated that the same expansion compensator may be used to connect any parts of a piping system together. For example, the expansion compensator may be used to connect a pipe with a fitting such as a valve, tees, couplers, elbows, and the like, or to connect one fitting with another fitting.

Reference is now made to FIGS. 1A to 7D, which exemplify different embodiments of an expansion compensator 100. Expansion compensator 100 includes an elongate metal conduit, referred to generally as 110, interior to which is positioned an inner plastic liner 120 that provides a fluid flow path through the expansion compensator 100. Also, first and second connectors 130A,B may be provided at opposite ends of the metal conduit and plastic liner. Connectors 130A,B may be used for coupling the expansion compensator to a piping system, as will be discussed further subsequently.

As shown in FIG. 1A, expansion compensator 100 comprises a first end 102, a second end 104, and an expansion/contraction section 106. Expansion/contraction section 106 allows for the axial length of expansion compensator 100 to vary in response to an applied axial force (either compressive or tensile). For example, if the position of first end 102 is fixed, and an axial force is applied to second end 104 in a direction towards first end 102, expansion/contraction section 106 may contract in the axial direction, reducing the axial length of expansion compensator 100. Also, if the position of first end 102 is fixed, and an axial force is applied to second end 104 in a direction away from first end 102, expansion/contraction section 106 may expand in the axial direction, increasing the axial length of expansion compensator 100. While expansion/contraction section 106 is illustrated as a bellows section having a series of convolutions, it will be appreciated that other geometric configurations such as sinusoidal or otherwise articulated surface may be used. These constructions permit the expansion compensator to temporarily deform (e.g., elastically deform) axially inwardly and outwardly during thermal expansion and contraction of the piping system, without fracture of the expansion compensator.

The main body of expansion compensator 100 comprises elongate metal conduit 110, within which is positioned inner plastic liner 120. Preferably, the opposite ends of metal conduit 110 and inner plastic liner 120 are coupled together to provide a unitary body (i.e., so that the respective ends of the outer metal conduit and the inner plastic liner axial will have the same relative displacement in response to an applied axial force). In such an arrangement, metal conduit 110 and inner plastic liner 120 may be characterized as springs acting in parallel. Thus, the overall axial stiffness of expansion compensator 100 (e.g. $k_{EC}$) may be approximated as the sum of the axial stiffness of metal conduit 110 (e.g. $k_{MC}$) and the axial stiffness of inner plastic liner 120 (e.g. $k_{IPL}$):

$$k_{EC} \approx k_{MC} + k_{IPL} \tag{1}$$

It follows that where the axial stiffness of the elongate metal conduit is greater than the stiffness of the inner plastic liner, a greater portion (preferably a substantial portion, and most preferably substantially all) of an axial force applied to expansion compensator 100 will be borne (e.g. absorbed) by metal conduit 110, while inner plastic liner 120 will bear a smaller portion (preferably a significantly smaller portion) of the applied axial force. Put another way, to balance (e.g. reach equilibrium with) an axial force $F_{EC}$ applied to expansion compensator 100, and assuming a common axial displacement −x (i.e. compression), the magnitude of the force exerted by each of metal conduit 110 ($F_{MC}$) and inner plastic liner 120 ($F_{IPL}$) will be proportional to their respective stiffness:

$$\begin{aligned}F_{EC} &= F_{MC} + F_{IPL} \\ &= (k_{MC} \cdot -x) + (k_{IPL} \cdot -x) \\ &= (k_{MC} + k_{IPL})(-x)\end{aligned} \tag{2}$$

For example, if the axial stiffness $k_{MC}$ is four times greater than the axial stiffness $k_{IPL}$, metal conduit 110 will provide about 80% of the total force exerted by expansion compensator 100 in response to an applied axial force.

While the stiffer metal conduit 110 may absorb the majority of an applied axial force, inner plastic liner 120 may provide a barrier between the metal conduit and a fluid flowing through expansion compensator 100. For example, inner plastic liner 120 may protect metal conduit 110 from corrosive or otherwise reactive fluids, extending the lifespan of metal conduit 110 and/or preventing portions of metal conduit 110 from leaching into fluids flowing through expansion compensator 100. Preferably, the expansion compensator has an inner plastic liner made from the same (or similar) thermoplastic material of the pipes to which it is to be installed, so that a fluid flowing through a pipe and expansion compensator will be in contact with the same (or similar) material through both components.

Metal conduit 110 may be made from steel, copper or other iron alloys, or any other metal used in the piping arts although it will be appreciated that other metallic materials may be suitable. Preferably, metal conduit 110 is made from one or more layers of stainless steel, such as SS316L stainless steel.

As exemplified in FIG. 3A, metal conduit 110 and inner plastic liner 120 each comprise a single layer, together forming a two-layer expansion compensator. For these embodiments, the thickness of metal conduit 110 may be from 0.005 to 0.050 inches, preferably from 0.010 to 0.020 inches, and more preferably from 0.012 to 0.016 inches. The thickness of inner plastic liner 120 may be from 0.005 to 0.125 inches, preferably from 0.020 to 0.1 inches, and more preferably from 0.040 to 0.090 inches.

It will be appreciated that metal conduit 110 and inner plastic liner 120 may be abutting as exemplified in FIG. 3B or they may be spaced apart. In some embodiments, in order to reduce friction a lubricant may be provided between metal conduit 110 and inner plastic liner 120. The lubricant may be any lubricant that is compatible with the inner plastic liner and metal conduit and may be talcum powder, powdered Teflon, powdered mica and the like.

Figure 3C:
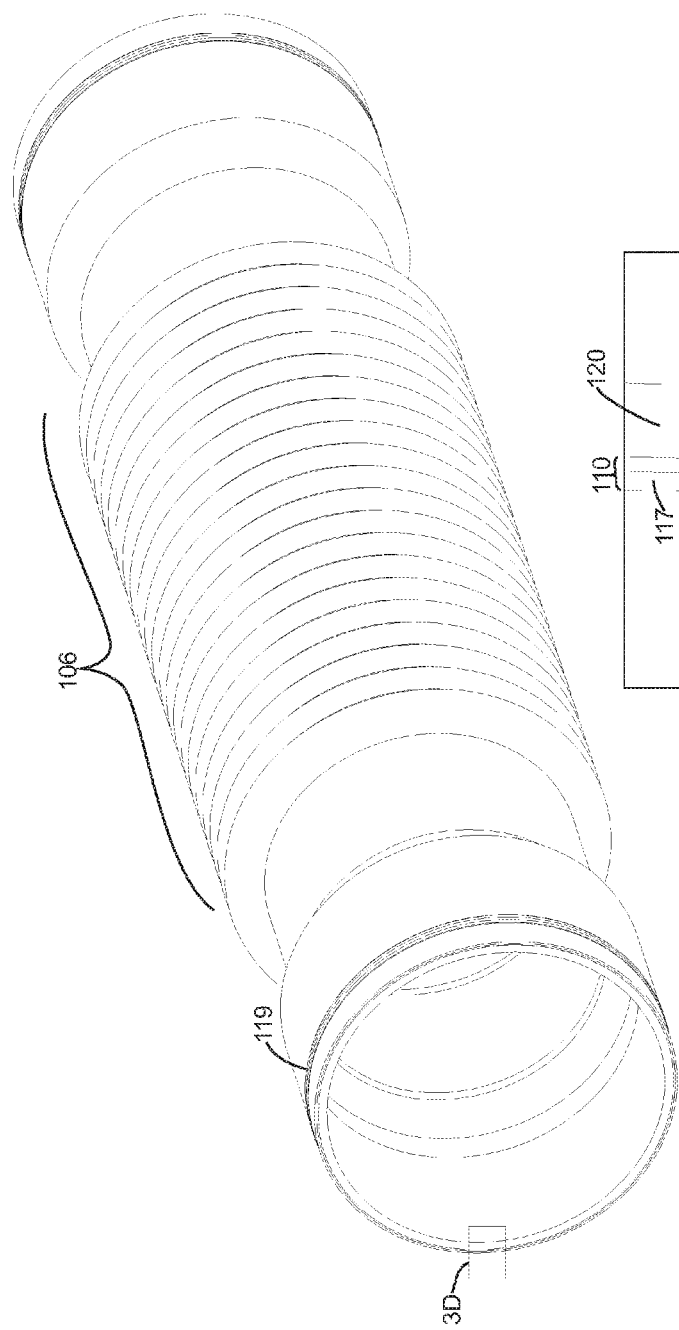
FIG. 3C is a perspective view of a two-layer elongate metal conduit and an inner plastic liner in accordance with another embodiment.
Figure 3D:
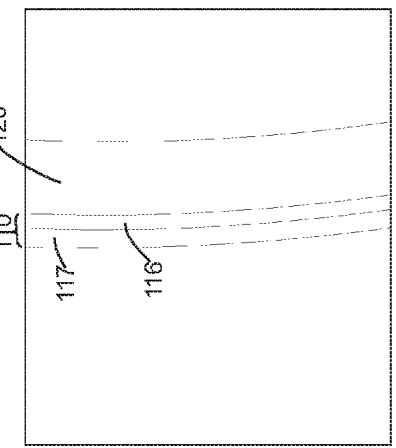
FIG. 3D is an enlarged view of the box in FIG. 3C.

It will also be appreciated that additional metal and/or plastic layers may be provided. For example, as shown in FIG. 3C and FIG. 1B, elongate metal conduit 110 may comprise an inner elongate metal conduit 116 and an outer elongate metal conduit 117, together with inner plastic liner 120 forming a three-layer expansion compensator. Where metal conduit 110 comprises more than one metal layer, it will be appreciated that the overall axial stiffness of metal conduit 110 may be approximated as the sum of the axial stiffness for each metal layer. In such a case, inner elongate metal conduit 116 and outer elongate metal conduit 117 may have the same stiffness or they may be different. It will also be appreciated that inner elongate metal conduit 116, outer elongate metal conduit 117 and inner plastic liner 120 may be abutting as exemplified in FIG. 3D or they may be spaced apart. In some embodiments, in order to reduce friction a lubricant may be provided between inner elongate metal conduit 116 and inner plastic liner 120.

In embodiments where metal conduit 110 comprises two layers, the thickness of each metal conduit 116,117 may be from 0.005 to 0.025 inches, preferably from 0.008 to 0.020 inches, and more preferably from 0.012 to 0.016 inches.

With continued reference to FIG. 1B, metal conduit 110 (illustrated here as comprising an inner elongate metal conduit 116 and an outer elongate metal conduit 117) has an outer surface 112 and an inner surface 114. Inner surface 114 is adjacent an outer surface 122 of inner plastic liner 120, while inner surface 124 of inner plastic liner 120 defines the interior volume of expansion compensator 100 between connectors 130A,B.

Connectors 130A,B may be provided at one or both ends of expansion compensator 100, and may be configured or adapted for coupling expansion compensator 100 to other components of a piping system. For example, connectors 130A,B may comprise exterior and/or interior surface features (e.g. threads, grooves, ridges, tabs), and may be dimensioned to receive (and/or be received within) a number of piping system components, such as pipes, fittings, valves, and the like. Also, while connectors 130A,B in the illustrated embodiments are substantially similar to each other, it will be appreciated that in alternative embodiments different connectors (e.g. for coupling to different sizes and/or types of components) may be provided on opposite ends of the same expansion compensator.

Figure 2:
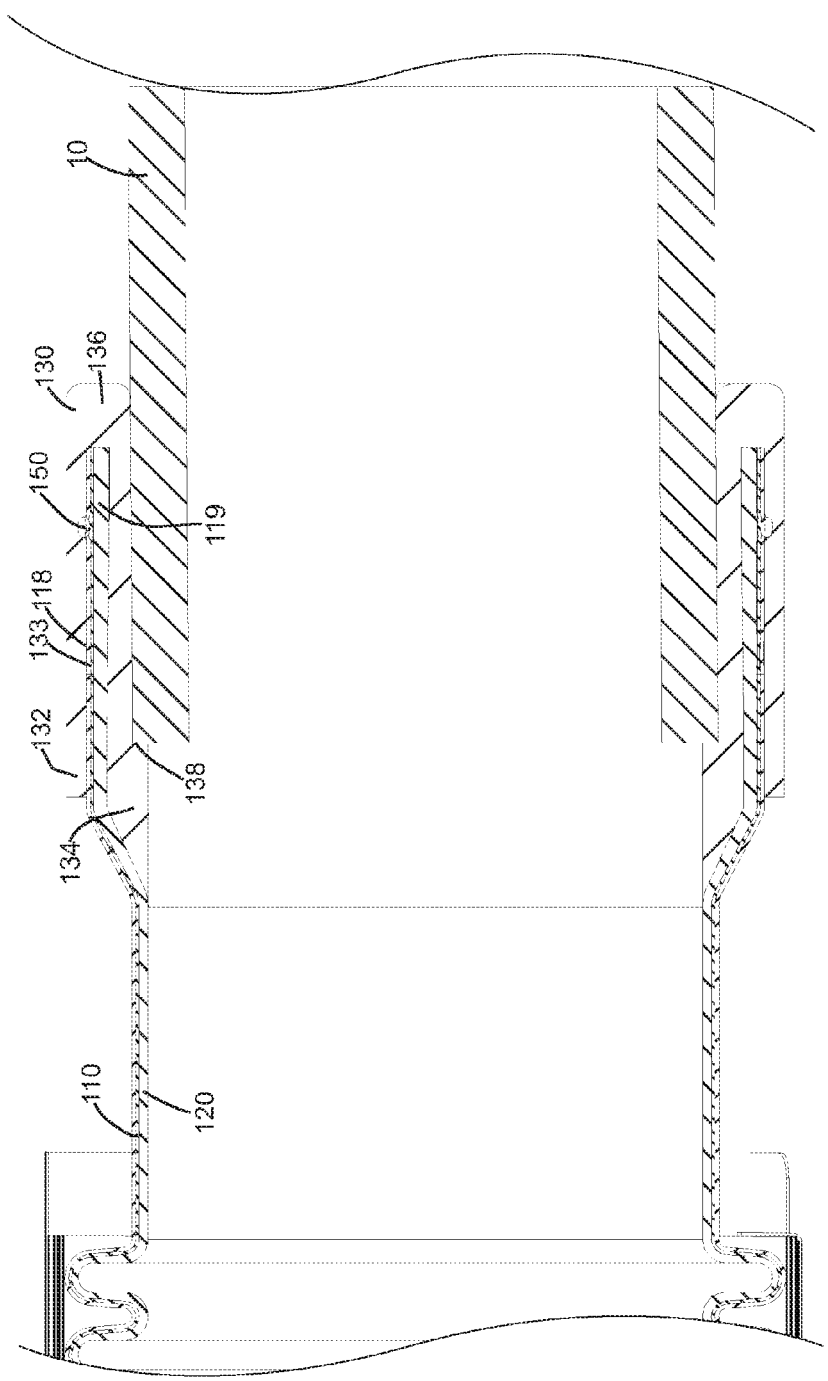
FIG. 2 is a cross section view of an end of the expansion compensator of FIG. 1A joined to a pipe end.

The apparatus exemplified uses an insertion fit, i.e., one end of one part of a piping system is inserted into an open end of another part of the piping system. For example, connector 130A,B may be dimensioned to receive first and second pipe ends inserted into first end 102 and second end 104, respectively, of expansion compensator 100. Connector 130 may be configured such that an end of a pipe may be inserted only up to a predetermined distance into connector 130. This may assist in aligning one or more features (e.g. injection passages, grooves) of the connector and/or the pipe end with each other. Therefore, a stop member may be provided inside connector 130. For example, as exemplified in FIG. 1B, in some embodiments one or both connectors 130A,B may comprise an interior ridge 138 that provides an abutment surface against which a pipe end inserted into the respective connector 130A,B will abut when inserted a predetermined distance, to assist in coupling expansion compensator 100 to a pipe end, as shown in FIG. 2. It will be appreciated that interior ridge 138 may have a height that is similar to or the same as the thickness of the pipe inserted into end 104. Accordingly, the cross sectional area of flow through the pipe and the end of the expansion compensator is generally the same.

Returning to FIG. 1B, each connector 130 is secured to each of metal conduit 110 and inner plastic liner 120 to thereby secure metal conduit 110 and inner plastic liner 120 together. As exemplified, connector 130 has a first portion or arm 132 secured to the outer surface 112 of elongate metal conduit 110, and a second portion or arm 134 secured to the inner surface 124 of inner plastic layer 120. In the illustrated embodiment, first portion 132 and second portion 134 are connected via an end portion 136, such that connector 130 defines a generally U-shaped cavity between portions 132, 134, and 136.

In some embodiments, as shown in FIG. 2 and FIG. 5, the ends of metal conduit 110 may be provided with a plurality of openings 118. These openings may assist in securing connectors 130A,B to respective ends of expansion compensator 100. Also, engagement of connector 130 and openings 118 in metal conduit 110 may allow a greater portion of an axial force applied to connector 130 to be transferred to metal conduit 110, rather than to inner plastic liner 120.

For example, openings 118 may allow a portion of outer portion 132 of connector 130 to project into metal conduit 110, which may provide a more robust connection between metal conduit 110 and connector 130. These connecting portions 133 extending through openings 118 may be provided by overmolding portions 132, 134, and 136 of connector 130 onto the ends of metal conduit 110 and inner plastic liner 120. An advantage of connecting portions 133 is that connecting portions 133 extend at about 90° to the axial forces that are expected to be exerted on expansion compensator 100 by thermal cycling. Thus, the axial forces that are applied to expansion compensator 100 may be transferred to metal conduit 110 via connectors 130A,B, and not via inner plastic liner 120.

An advantage of forming connecting portions 133 by overmolding, is that portions 132, 134 of connector 130, connecting portions 133 and inner liner 120 may be formed essentially as a unitary body (e.g., the plastic that is used to overmold will heat inner liner 120 and may melt a sufficient amount of inner liner 120 to be secured thereto). Metal conduit 110 may therefore be embedded therein and securely fixed in position and thereby be adapted to incur axial stresses applied by thermal cycling.

Alternatively, connectors 130 may be formed with projections on the inner surface of first portion 132 sized and located to be received in openings 118 and act as connecting portions 133 when connector 130 is mounted (e.g. press-fit or snapped on to) an end 102, 104 of metal conduit 110. In this latter case, the connecting portions 133 may be secured to inner plastic liner 120 by, e.g., an adhesive, welding or the like. Optionally, inner plastic liner 120 may be secured to portions 134 of connector 130 in a similar manner.

Alternatively, or additionally, the ends of metal conduit 110 may be provided with one or more surface features (e.g. radial ridges or grooves) to facilitate the installation of a gasket between metal conduit 110 and outer portion 132 of connector 130. For example, as shown in FIGS. 1B and 5, a radial groove 119 may be provided on outer surface 112 of an end of metal conduit 110, radial groove 119 being configured to receive a gasket such as an O-ring 150. Such a gasket may be provided to minimize the chance of fluid leaking from expansion compensator 100 via, e.g., a gap between inner surface 124 of inner plastic liner 120 and second portion 134 of connector 130, between the ends of metal conduit 110 and inner plastic liner 120 and end portion 136 of connector 130, and between outer surface 112 of metal conduit 110 and first portion 132 of connector 130. Radial groove 119 may assist in locating and retaining O-ring 150 relative to the end of expansion compensator 100 as connector 130 is mounted and/or molded to an end 102, 104 of metal conduit 110. It will be appreciated that a gasket may be provided in the absence of a groove 119.

As noted previously, FIGS. 3A and C depict, respectively, two- and three-layer expansion compensator bodies. If elongate metal conduit 110 comprises inner elongate metal conduit 116 and outer elongate metal conduit 117, then each metal conduit 116, 117 may be provided with openings 118. Accordingly, even if two metal conduits 116, 117 are used, connecting portions 133 may extend from portion 132 through both metal conduits 116, 117 to be secured to inner plastic liner 120, which itself may be secured to portion 134 of connector 130, such as by heating to form a unitary body, an adhesive or the like.

It will be appreciated that expansion compensator 100 may comprise additional layers. For example, in FIG. 3E a protective layer 170 is disposed between metal conduit 110 (which itself comprises elongate metal conduits 116, 117) and inner plastic liner 120. Protective layer 170 may serve to reduce the friction between metal conduit 110 and inner plastic liner 120 during expansion and/or contraction of expansion compensator 100. Also, protective layer 170 may provide an additional 'failsafe' layer to prevent leakage of fluid from within expansion compensator 100 (e.g. should one or more cracks develop in inner plastic liner 120 and/or metal conduit 110).

Protective layer 170 is located between metal conduit 110 and inner plastic liner 120 and may abut a surface or may be spaced from the facing surfaces. It will be appreciated that inner elongate metal conduit 116, protective layer 170 and inner plastic liner 120 may be abutting as exemplified in FIGS. 3E and 3F or they may be spaced apart.

Protective layer 170 may be provided: as a coating on outer surface 122 of inner plastic liner 120; as a coating on inner surface 114 of elongate metal conduit 110; and/or as a separate layer positioned between metal conduit 110 and inner plastic liner 120 during the manufacture of expansion compensator 100. For example, inner plastic liner 120 may comprise a co-extruded body having protective layer 170 formed as an outer co-extruded layer to inner plastic liner 120.

Preferably, protective layer 170 is made from polytetrafluoroethylene (PTFE) or one or more other suitable fluoropolymers, although it will be appreciated that other materials may be used.

FIG. 3G illustrates an embodiment where protective layer 170 is disposed between metal conduit 110 (which itself comprises elongate metal conduits 116, 117) and a two-layer inner plastic liner 120 (comprising inner plastic layer 126 and outer plastic layer 127). Where inner plastic liner 120 comprises more than one plastic layer, it will be appreciated that the overall axial stiffness of inner plastic liner 120 may be approximated as the sum of the axial stiffness for each plastic layer. In such a case, each plastic layer may have the same stiffness or they may be different. As exemplified therein, outer elongate metal conduit 117, inner elongate metal conduit 116, protective layer 170, inner plastic layer 126 and outer plastic layer 127 may each be abutting as exemplified in FIG. 3H or one or more may be spaced apart.

In embodiments where inner plastic liner 120 comprises two layers (e.g., together forming a four-layer expansion compensator as exemplified in FIG. 3G), the thickness of each plastic layer 126,127 may be from 0.005 to 0.075 inches, preferably from 0.020 to 0.050 inches, and more preferably from 0.03 to 0.045 inches.

As illustrated in FIG. 4A, expansion compensator 100 may be provided with a sleeve 140. Sleeve 140 may overlie some and preferably all or essentially all of expansion/contraction section 106 to protect against damage, restrain deflection of expansion/contraction section 106 in a radial or lateral direction, and/or provide a distinctive aesthetic appearance to expansion compensator 100. For example, expansion/contraction section 106 of expansion compensator 100 may have a corrugated exterior surface. This surface might get caught (which could cause damage to the expansion compensator) as a pipe with the expansion compensator is slid into position. Providing a sleeve 140 over some or all of expansion/contraction section 106 may assist the expansion compensator being placed is position. In addition, when axially loaded, expansion/contraction section 106 of expansion compensator 100 may tend to deflect laterally instead of compress. Sleeve 140 may overlie some or all of expansion compensator 100 so as to inhibit, and preferably, prevent, lateral deflection under axial loading. In such a case, the inner diameter of sleeve 140 is preferably proximate that of the outer diameter of expansion/contraction section 106.

Sleeve 140 may have one or more tabs 144 or other engagement means to retain it in a preset axial position about expansion compensator 100. The engagement means permit sleeve 140 to be retained in position while still allowing expansion compensator 100 to expand and contract. Accordingly, for example, tabs 144 may be positioned axially outwardly from the axially opposed ends of expansion/contraction section 106 so as to permit expansion/contraction section 106 to expand and contract through its entire design distance without restriction. Accordingly, tabs 144 may be spaced sufficiently from the last ridge of expansion/contraction section 106 (i.e. the ridge closes to the connector) such that, when fully expanded the ridge may at most abut tab 144.

Figure 4B:
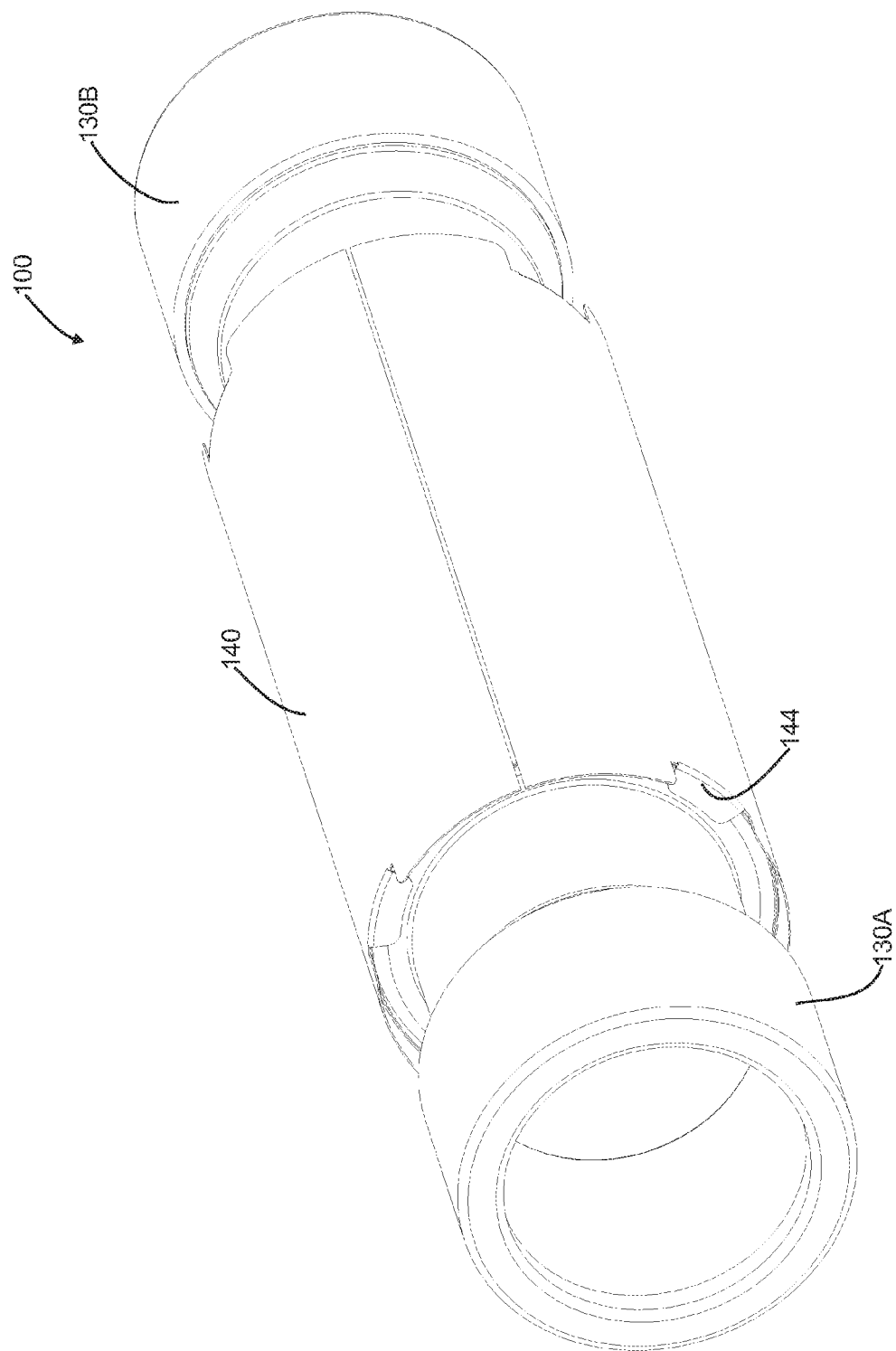
FIG. 4B is a perspective view of the expansion compensator of FIG. 1A with an alternate sleeve.

Alternatively, or additionally, sleeve 140 may have one or more viewing ports 142 to allow for visual inspection of the outer surface 112 of metal conduit 110 in the expansion/ contraction section 106. FIG. 4B illustrates an example sleeve 140 without viewing ports 142.

Methods for manufacturing expansion compensator 100 are described in Canadian patent application numbers 2,847,520 and 2,847,536 filed on Mar. 25, 2014, and in U.S. patent publication No. 2015-0273756, entitled METHODS OF MANUFACTURING AN EXPANSION COMPENSATOR, filed concurrently herewith, the disclosures of which are incorporated herein by reference.

FIG. 5 illustrates a sleeve guard 146 that may be disposed between the outer surface 112 of metal conduit 110 and the inner surface of sleeve 140, so as to reduce friction and/or provide abrasion resistance between these components and/or to reinforce sleeve 140 and/or to provide a sliding fit on expansion/contraction section 106. It will be appreciated that more (as shown in FIG. 7B) or fewer (as shown in FIG. 4A) sleeve guards may be provided.

Figure 6A:
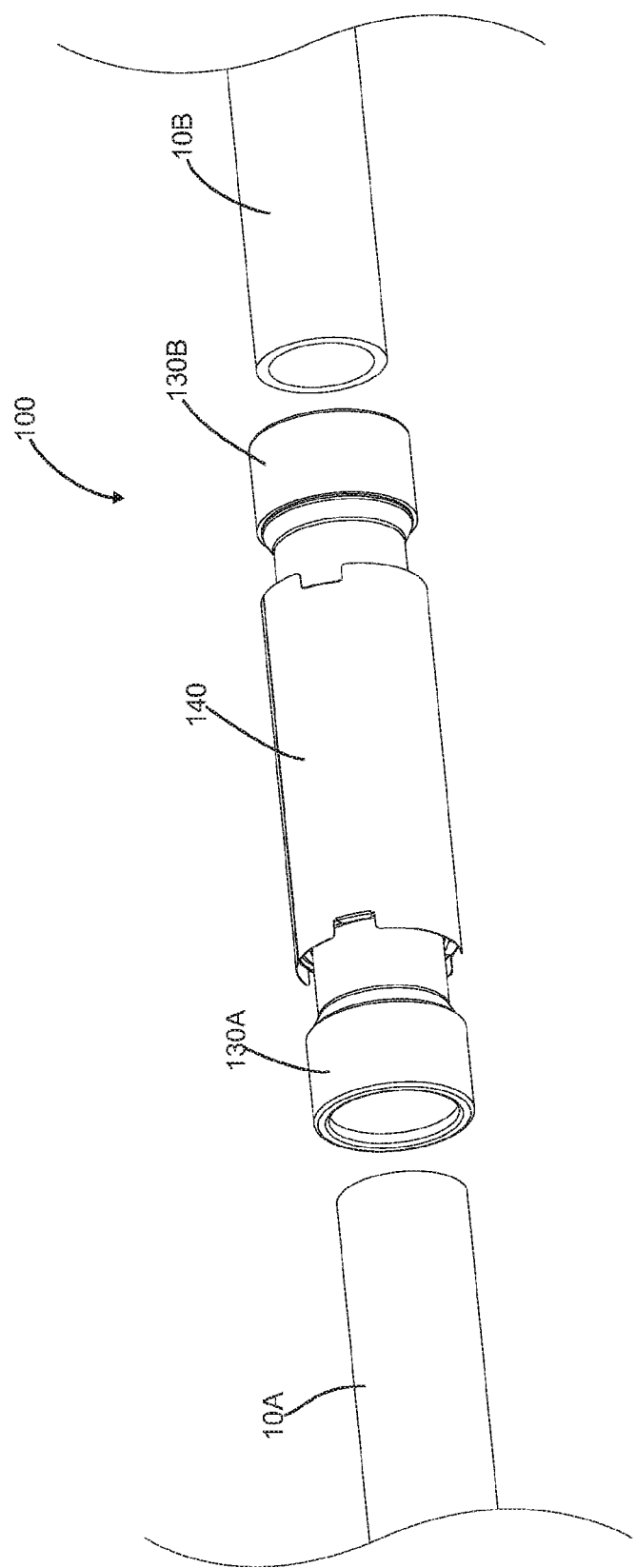
FIG. 6A is a perspective view of the expansion compensator of FIG. 4B disposed between two pipe ends.
Figure 6B:
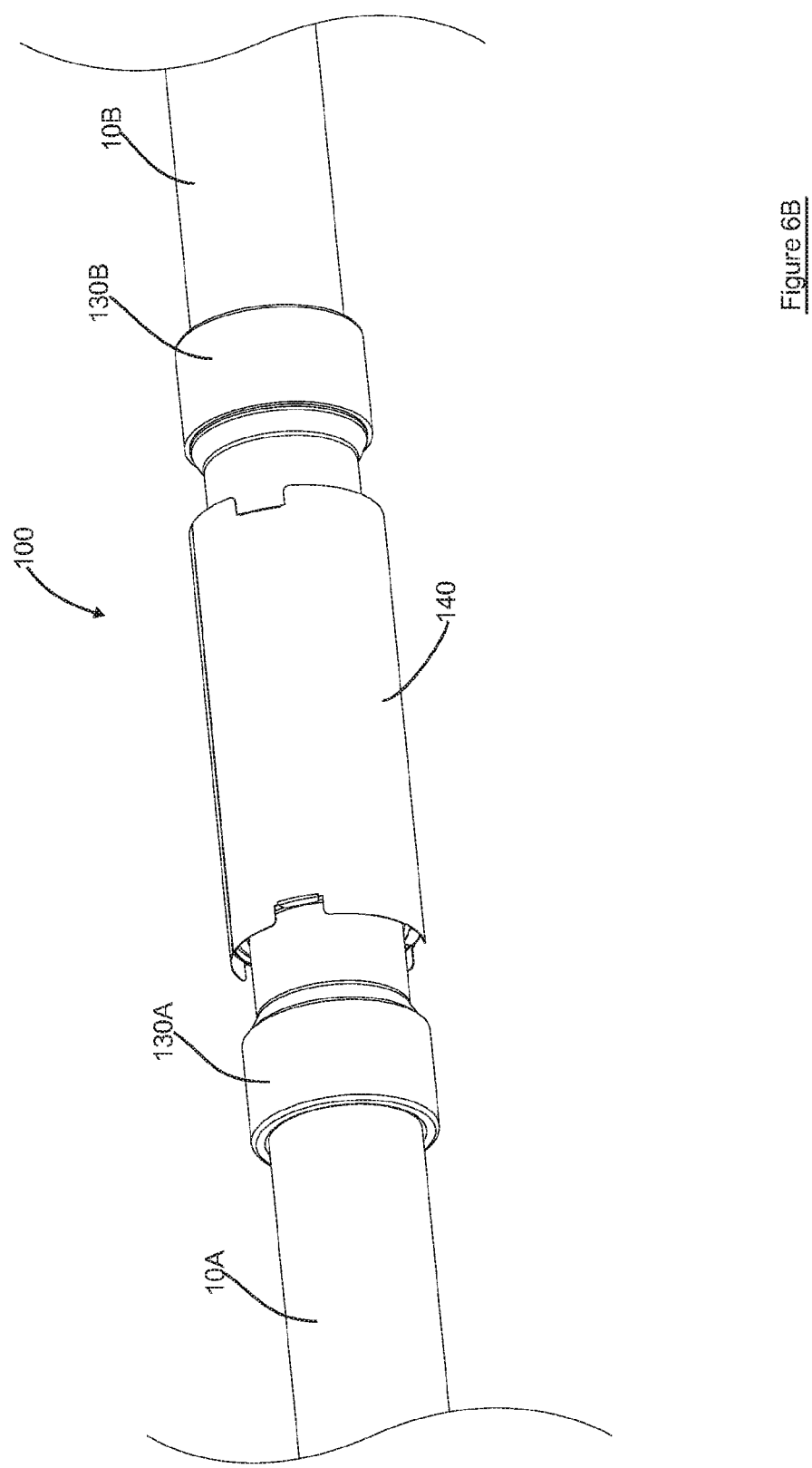
FIG. 6B is a perspective view of the expansion compensator and pipe ends of FIG. 6A with the pipe ends received in the connectors of the expansion compensator.

Turning to FIG. 6A, expansion compensator 100 is shown disposed between and aligned with pipe ends 10a,b. More specifically, connector 130a is aligned with pipe end 10a, and connector 130b is aligned with pipe end 10b. In the illustrated embodiment, connectors 130A,B are dimensioned to receive therein, respectively, pipe ends 10a,b. FIG. 6B shows expansion compensator 100 once it has been coupled to pipe ends 10a,b. It will be appreciated that the ends of connectors 130A,B may be configured to be connected to a pipe end 10a,b by any means known in the piping arts.

FIG. 7A shows a cross section view of expansion compensator 100 coupled to pipe ends 10a,b. As discussed above, expansion/contraction section 106 allows for the axial length of expansion compensator 100 to vary in response to an axial force (either compressive or tensile) applied by pipe end 10a and/or 10b. For example, if thermal expansion of one or both of the pipes 10 causes pipe ends 10a,b to attempt to move towards each other, the pipe ends will exert a compressive force along the longitudinal axis of expansion compensator 100. Such a compressive force may be exerted (or imposed) on expansion compensator 100 by a piping system in response to water having a temperature of from about 55° C. to about 85° C. flowing through the piping system. In response to such an applied force, expansion/contraction section 106 may contract in the axial direction, reducing the axial length of expansion compensator 100. The amount of contraction of expansion compensator 100 will depend on the amount of the applied compressive force, and the overall axial stiffness of expansion compensator 100. Also, as noted above, where the axial stiffness of the elongate metal conduit is greater than the stiffness of the inner plastic liner, a greater portion of the applied compressive force will be borne (e.g. absorbed) by metal conduit 110 while expansion compensator 100 is compressed, and the stress on plastic liner 120 may accordingly be reduced.

As another example, if thermal contraction of one or both of the pipes 10 causes pipe ends 10a,b to attempt to move away from each other, the pipe ends may exert a tensile force along the longitudinal axis of expansion compensator 100. In response to such an applied force, expansion/contraction section 106 may expand in the axial direction, increasing the axial length of expansion compensator 100. Again, the amount of expansion of expansion compensator 100 will depend on the amount of the applied tensile force and the axial stiffness of expansion compensator 100. Also, where the axial stiffness of the elongate metal conduit is greater than the stiffness of the inner plastic liner, a greater portion of the applied tensile force will be borne by metal conduit 110 while expansion compensator 100 is expanded, and the stress on plastic liner 120 may accordingly be reduced.

It will be appreciated that the stiffness of expansion compensator 100 may vary based on the number of metal layers in metal conduit 110, the particular metal or metals used, the thickness of each metal layer, and/or the geometry of metal conduit 110. The stiffness of expansion compensator 100 may also depend on the number of layers in inner plastic liner 120, the particular plastic or plastics used, the thickness of each plastic layer, and/or the geometry of inner plastic liner 120.

It will also be appreciated that the overall stiffness of expansion compensator 100 may be selected based on the forces expected to be imposed by a piping system into which it is installed, so as to reduce the stress in the piping system components. For example, an expansion compensator 100 with a relatively lower overall stiffness may compress or expand more easily in response to an applied force than an expansion compensator 100 with a relatively higher overall stiffness. Providing a more pliant expansion compensator 100 may allow greater axial deformation (e.g. expansion or contraction) of piping system components in response to expected thermal changes, which may reduce the internal stress in these components.

As noted above, expansion/contraction section 106 is generally illustrated as a bellows section having a series of convolutions. While the expansion/contraction sections of metal conduit 110 and inner plastic liner 120 are shown with complementary profiles (e.g. each have a similar profile, and these profiles are aligned), it will be appreciated that that this need not be the case. For example, metal conduit 110 and inner plastic liner 120 may have different profiles and/or the profiles need not be aligned.

Alternatively, or additionally, while outer surface 122 of inner plastic liner 120 is illustrated as being in contact with (e.g. abutting) inner surface 114 of metal conduit 110, it will be appreciated that in some embodiments, an air gap may be present along all or part of the length of expansion compensator 100.

Alternatively, or additionally, inner plastic liner 120 may not have a uniform radial thickness. For example, as shown in FIG. 7B, where expansion/contraction section 106 comprises an alternating series of radially outer peaks 160A,B,C and radially inner valleys 162A,B,C, the radial thickness $T_P$ of inner plastic liner 120 at the radially outer peaks 160A,B,C may be less than the radial thickness $T_V$ of inner plastic liner 120 at the radially inner valleys 162A,B,C. Such variations in thickness may arise, for example, where a plastic cylinder of substantially uniform thickness is positioned within metal conduit 110, heated, and then expanded outwards against inner surface 114 of metal conduit 110. Also, inner plastic liner 120 may be expected to experience more erosion or wear at radially inner valleys 162A,B,C as compared with portions of inner plastic liner 120 at radially outer peaks 160A,B,C, as radially inner valleys 162A,B,C may be exposed to higher velocity flows of fluid through expansion compensator 100. Accordingly, providing increased thickness at portions of inner plastic liner 120 that are expected to experience higher erosion or wear may extend the operating lifespan of expansion compensator 100.

In some embodiments, the ratio of the radial thickness $T_V$ to the radial thickness $T_P$ may be up to about 2:1, or up to about 3:1, or up to about 4:1. For example, the radial thickness $T_P$ of inner plastic liner 120 at the radially outer peaks 160A,B,C may be about 0.040 inches, and the radial thickness $T_V$ of inner plastic liner 120 at the radially inner valleys 162A,B,C may be about 0.080 inches (i.e. the ratio of $T_V$ to $T_P$ is about 2:1).

Alternatively, as shown in FIGS. 7C and 7D, the radial thickness $T_p$ of inner plastic liner 120 in radially outer peaks 160A,B,C may be substantially equal to the radial thickness $T_V$ of inner plastic liner 120 in radially inner valleys 162A,B,C. Such a uniform thickness for inner plastic liner 120 may be achieved, for example, by expanding a plastic cylinder of non-uniform thickness outwardly against inner surface 114 of metal conduit 110 or using the inner surface of metal conduit as an interior mold surface. Providing a generally uniform thickness for inner plastic liner 120 may assist in predicting and/or controlling the axial stiffness of inner plastic liner 120, and thus the overall axial stiffness of expansion compensator 100. For example, the radial thickness $T_p$ of inner plastic liner 120 at the radially outer peaks 160A,B,C may be about 0.060 inches, and the radial thickness $T_V$ of inner plastic liner 120 at the radially inner valleys 162A,B,C may be about 0.060 inches (i.e. the ratio of $T_V$ to $T_P$ is about 1:1).

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An expansion compensator having a longitudinal axis and comprising:
   a) an elongate metal conduit having first and second spaced apart ends, an inner surface, an outer surface, a thickness, and an expansion/contraction section; and
   b) an inner plastic liner positioned interior of the elongate metal conduit and having first and second spaced apart ends, an inner surface, an outer surface, a thickness, an expansion/contraction section, and an interior volume extending from the first end to the second end;
   wherein the first and second spaced apart ends of the elongate metal conduit and the inner plastic liner are secured together,
   and wherein each of the elongate metal conduit and the inner plastic liner have a stiffness along the longitudinal axis, and the stiffness of the elongate metal conduit is greater than the stiffness of the inner plastic liner and
   wherein the first spaced apart ends of the elongate metal conduit and the inner plastic liner are secured together by a first connector, the first connector comprising a first arm that is secured to the first end of the inner plastic liner, a second arm that is secured to the first end of the elongate metal conduit and an end portion that is connected to each of the first and second arms and;

and the second spaced apart ends of the elongate metal conduit and the inner plastic liner are secured together by a second connector, the second connector comprising a first arm that is secured to the first end of the inner plastic liner, a second arm that is secured to the first end of the elongate metal conduit and an end portion that is connected to each of the first and second arms.

2. The expansion compensator of claim 1 wherein the stiffness of the elongate metal conduit is at least 25% greater than the stiffness of the inner plastic liner.

3. The expansion compensator of claim 1 wherein the stiffness of the elongate metal conduit is at least 50% greater than the stiffness of the inner plastic liner.

4. The expansion compensator of claim 1 wherein the stiffness of the elongate metal conduit is from at least 150% greater to about 1,000% greater than the stiffness of the inner plastic liner.

5. The expansion compensator of claim 4 wherein the stiffness of the elongate metal conduit is from at least 300% greater to about 375% greater than the stiffness of the inner plastic liner.

6. The expansion compensator of claim 1 wherein the stiffness of the elongate metal conduit is sufficiently greater than the stiffness of the inner plastic liner such that the elongate metal conduit will absorb more than 50% of a compressive force imposed on the expansion compensator by a piping system into which the expansion compensator is positioned.

7. The expansion compensator of claim 6 wherein the stiffness of the elongate metal conduit is sufficiently greater than the stiffness of the inner plastic liner such than the elongate metal conduit will absorb more than 75% of the compressive force.

8. The expansion compensator of claim 6 wherein the stiffness of the elongate metal conduit is sufficiently greater than the stiffness of the inner plastic liner such than the elongate metal conduit will absorb about 90% of the compressive force.

9. The expansion compensator of claim 1 wherein the thickness of the elongate metal conduit and the thickness of the inner plastic liner are each selected to provide the stiffness of the elongate metal conduit that is greater than the stiffness of the inner plastic liner.

10. The expansion compensator of claim 9 wherein the thickness of the elongate metal conduit is from about 0.005 to about 0.030 inches and the thickness of the inner plastic liner is from about 0.005 to about 0.250 inches.

11. The expansion compensator of claim 9 wherein the thickness of the elongate metal conduit is from about 0.012 to about 0.016 inches and the thickness of the inner plastic liner is from about 0.040 to about 0.090 inches.

12. The expansion compensator of claim 1 wherein the first spaced apart ends of the elongate metal conduit and the inner plastic liner are secured together by a first connector that is molded over the first spaced apart ends and the second spaced apart ends of the elongate metal conduit and the inner plastic liner are secured together by a second connector that is molded over the second spaced apart ends.

13. The expansion compensator of claim 12 wherein each of the first and second ends of the elongate metal conduit has a plurality of openings therethrough and each of the first and second connectors further comprise a connecting portion that extends through the plurality of openings.

14. The expansion compensator of claim 12 further comprising a gasket provided on the elongate metal conduit and extending between the outer surface of the elongate metal conduit and an inner surface of the first connector.

15. The expansion compensator of claim 1 wherein the elongate metal conduit comprises at least an inner and an outer elongate metal conduit, the inner elongate metal conduit is positioned intermediate the outer elongate metal conduit and the inner plastic liner, and each of the inner and outer elongate metal conduits has first and second spaced apart ends, an inner surface, an outer surface, and an expansion/contraction section.

16. The expansion compensator of claim 15 wherein the thickness of each of the inner and outer elongate metal conduit is from about 0.004 to about 0.025 inches and the thickness of the inner plastic liner is from about 0.005 to about 0.250 inches.

17. The expansion compensator of claim 15 wherein the thickness of each of the inner and outer elongate metal conduit is from about 0.012 to about 0.016 inches and the thickness of the inner plastic liner is from about 0.040 to about 0.090 inches.

18. The expansion compensator of claim 15 wherein a lubricant is provided between the inner and outer elongate metal conduits.

19. The expansion compensator of claim 1 further comprising a protective layer intermediate the inner surface of the elongate metal conduit and the outer surface of the inner plastic liner.

20. The expansion compensator of claim 19 wherein:
a) the protective layer comprises a coating or a film applied to at least one of the inner surface of the elongate metal conduit and the outer surface of the inner plastic liner; or
b) the inner plastic liner comprises a co-extruded body having the protective layer formed as an outer co-extruded layer; or
c) the protective layer comprises a separately formed sleeve positioned between the inner surface of the elongate metal conduit and the outer surface of the inner plastic liner.

21. The expansion compensator of claim 1 wherein the expansion/contraction sections have a similar profile and are aligned.

22. The expansion compensator of claim 1 wherein the inner plastic liner has a generally uniform thickness.

23. The expansion compensator of claim 22 wherein the sleeve further comprises engagement members positioned to maintain the sleeve in a predetermined axial position along the expansion compensator and to permit the expansion/contraction sections to expand to a full design expansion length.

24. The expansion compensator of claim 1 wherein the expansion/contraction section of the inner plastic liner comprises a bellows comprising in sequence a plurality of radially inner valleys and a plurality of radially outer peaks, a portion of the inner plastic liner defining the radial inner valleys having a greater radial thickness then a portion of the inner plastic liner defining the radial outer peaks.

25. The expansion compensator of claim 1 further comprising a longitudinally extending recess provided in the inner wall of the elongate metal conduit.

26. The expansion compensator of claim 1 further comprising a sleeve, the sleeve having a generally longitudinally extending outer surface and the elongate metal conduit is provided interior of the sleeve.

27. The expansion compensator of claim 26 wherein a lubricant is provided between the sleeve and the elongate metal conduit.

* * * * *